(12) United States Patent
Schenck et al.

(10) Patent No.: US 12,496,973 B2
(45) Date of Patent: Dec. 16, 2025

(54) METHOD FOR OPERATING A VEHICLE AND A VEHICLE

(71) Applicant: Volkswagen Aktiengesellschaft, Wolfsburg (DE)

(72) Inventors: Malte Schenck, Braunschweig (DE); Michael Wistrach, Braunschweig (DE); Stefan Hoffmann, Adenbüttel (DE); Marek Grünewald, Velpke (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 72 days.

(21) Appl. No.: 18/434,011

(22) Filed: Feb. 6, 2024

(65) Prior Publication Data

US 2024/0270171 A1 Aug. 15, 2024

(30) Foreign Application Priority Data

Feb. 15, 2023 (DE) ...................... 10 2023 201 256.1

(51) Int. Cl.
*B60R 1/26* (2022.01)

(52) U.S. Cl.
CPC .......... *B60R 1/26* (2022.01); *B60R 2300/105* (2013.01); *B60R 2300/806* (2013.01); *B60R 2300/8066* (2013.01)

(58) Field of Classification Search
CPC .......... G08G 1/16; G08G 1/166; G08G 1/167; B60R 1/26; B60R 2300/105; B60R 2300/806; B60W 10/04; B60W 10/18; B60W 10/20; B60W 30/09; B60W 30/095; B60W 50/12; B60W 50/14; B60W 50/16;

(Continued)

(56) References Cited

U.S. PATENT DOCUMENTS

| 2014/0203925 A1 | 7/2014 | Augst ......................... 340/435 |
| 2016/0266886 A1 | 9/2016 | Sarkar et al. ................. 717/173 |

(Continued)

FOREIGN PATENT DOCUMENTS

| DE | 102007032257 A1 | 1/2009 | ............ B60K 35/00 |
| DE | 102011083770 A1 | 4/2013 | ............ B60W 30/08 |

(Continued)

OTHER PUBLICATIONS

German Office Action, Application No. 102023201256.1, 6 pages.

*Primary Examiner* — Van T Trieu
(74) *Attorney, Agent, or Firm* — Slayden Grubert Beard PLLC

(57) ABSTRACT

Disclosed is a method for operating a vehicle, in particular a motor vehicle, wherein the vehicle comprises at least one infotainment system with at least one first display region. The vehicle also comprises at least one instrument cluster with at least one second display region. The infotainment system comprises a software component, wherein information relating to driver assistance systems can be shown in the first display region of the infotainment system. To update the infotainment system while maintaining a driving operation of the vehicle simultaneously, it is provided that the information relating to the driver assistance systems is shown in the second display region of the instrument cluster when the software component of the infotainment system is being updated.

21 Claims, 2 Drawing Sheets

(58) Field of Classification Search
CPC ..... B60W 2050/143; B60W 2050/146; B60W 2554/801
See application file for complete search history.

(56) References Cited

U.S. PATENT DOCUMENTS

| | | |
|---|---|---|
| 2018/0074813 A1 | 3/2018 | Granda et al. |
| 2019/0258466 A1 | 8/2019 | Mitchell et al. |
| 2020/0282909 A1 | 9/2020 | Zimmerman et al. |
| 2020/0307616 A1* | 10/2020 | Nithiyanantham ............ G02B 27/0093 |
| 2021/0058528 A1* | 2/2021 | Deleverio .......... H04N 1/00413 |
| 2021/0179094 A1* | 6/2021 | Newman ................ G05D 1/617 |
| 2023/0017805 A1 | 1/2023 | Kohara |

FOREIGN PATENT DOCUMENTS

| | | | |
|---|---|---|---|
| DE | 102013000273 A1 | 7/2014 | ............. B60R 16/02 |
| DE | 102017120844 A1 | 3/2018 | ............. B60R 16/02 |
| DE | 102019104061 A1 | 8/2019 | ............. B60R 16/02 |
| DE | 102019200880 A1 | 7/2020 | ............. B60R 16/02 |
| DE | 102020103653 A1 | 9/2020 | ............ H04N 13/117 |
| DE | 112021002072 T5 | 1/2023 | ............ B60W 50/14 |

* cited by examiner

METHOD FOR OPERATING A VEHICLE AND A VEHICLE

CROSS-REFERENCE TO RELATED APPLICATIONS

This application claims priority to German Patent Application No. DE 10 2023 201 256.1, filed on Feb. 15, 2023 with the German Patent and Trademark Office. The contents of the aforesaid patent application are incorporated herein for all purposes.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

The teachings herein relate to a method for operating a vehicle, in particular a motor vehicle, wherein the vehicle comprises at least one infotainment system with at least one first display region, wherein the vehicle comprises at least one instrument cluster with at least one second display region, wherein at least the infotainment system comprises a software component, wherein information relating to driver assistance systems can be shown in the first display region of the infotainment system.

In addition, the teachings herein relate to a vehicle with at least one infotainment system with at least one first display region, with at least one instrument cluster with at least one second display region, and with at least one driver assistance system.

In modern vehicles, many components or, respectively, modules have software components that should be updated at regular intervals. Many components use what is known as firmware to execute basic functions, for which they are controlled by corresponding computing units, or, respectively, to execute these basic functions independently.

Infotainment systems in vehicles are very popular. They usually have a central computing unit and at least one display region, on which information about vehicle functions but also about entertainment components, such as the radio or a hands-free apparatus, can be displayed and controlled centrally, for example, in the center console of the vehicle. During the update of the software or, respectively, the firmware of the infotainment system, information about driver assistance systems cannot be displayed. Typically, until now the car is brought to a workshop for such an update and, during this process, must not be in driving operation.

SUMMARY

A need exists to provide a method for operating a vehicle as well as to provide a vehicle, using which it is possible to update an infotainment system efficiently.

The need is addressed by the subject matter of the independent claim(s). Embodiments of the invention are described in the dependent claims, the following description, and the drawings.

DESCRIPTION

Figure 1A:
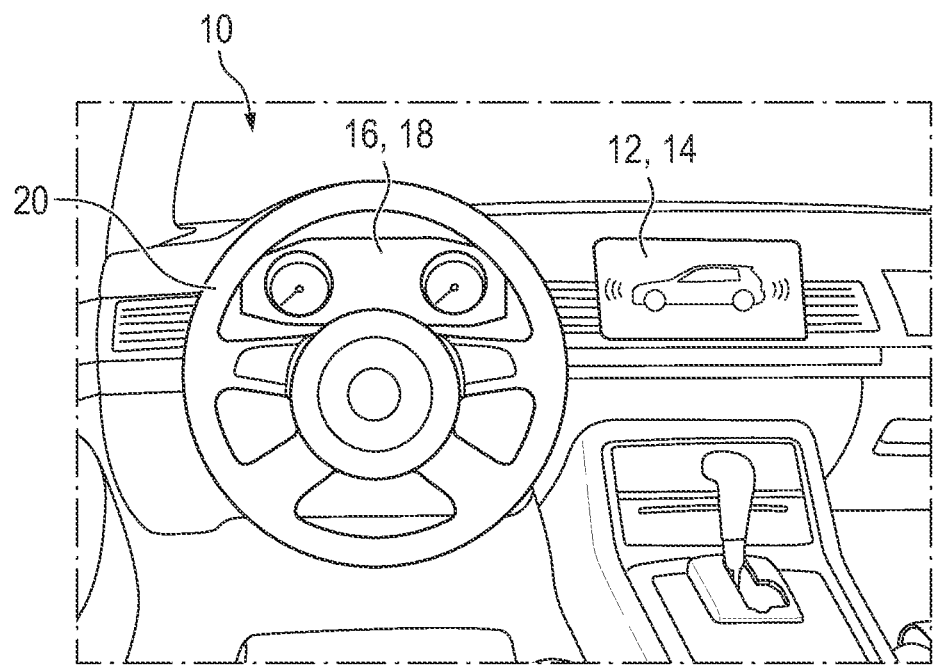
FIGS. 1a and b show an example interior of a vehicle when an embodiment of a method according to the teachings herein is carried out.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, information relating to a driver assistance systems is shown in a second display region of an instrument cluster when at least one software component of an infotainment system is being updated. In some embodiments information relating to a driver assistance systems is switched to the second display region of the instrument cluster when the software component is being updated.

The infotainment system can be any typical system, for example an infotainment system or an entertainment system from the prior art with at least one computing unit or processor and a corresponding first display region. The first display region can in some embodiments be a display in the central region of the vehicle. Alternatively or in addition and in some embodiments, the first display region can be designed as a head-up display. A head-up display is understood to mean a display region in which information is projected, for example, onto the windshield of the vehicle. This information can then be shown, for example, in the field of view of the driver.

The instrument cluster can in some embodiments be an instrument cluster as known from the prior art. Such instrument clusters are typically and in some embodiments arranged behind the steering wheel, e.g., visible for the driver of the vehicle. In this manner, the driver can read important information about speeds, rotational speeds, temperatures, or similar without having to move their head. The instrument cluster according to some embodiments comprises at least one second display region. The second display region can also be a display. It is in some embodiments conceivable for the entire instrument cluster to implement a representation of all information by means of a display, instead of analog pointers. In addition, a head-up display can also be provided in the instrument cluster in some embodiments. The at least one software component of the infotainment system is in some embodiments a necessary component to allow information to be displayed to the driver on the display.

The information relating to a driver assistance system can in some embodiments be information that enables the driver to more easily perform driving maneuvers. In this case, it may for example comprise notices and/or warnings that give the driver of the vehicle a point of reference to the current driving process and/or the surroundings.

It is beneficial in some embodiments that the first display region and the second display region can show the information in the same way. If the first display region of the infotainment system is a display, the second display region should in some embodiments also be able to show the information analogously to the display of the first display region. This is most simply implemented with another display.

If the software of the infotainment system must now be updated, it is possible according to the teachings herein for the information shown in the first display region relating to the driver assistance system to be shown in the second display region. The infotainment system can then be readily updated, wherein information that is important for the driver continues to be shown in a display region in the surroundings of the driver's field of view.

In this case and in some embodiments, the representation can be chosen such that the information previously shown by the instrument cluster continues to be visible. For example, it can be provided that the representation is reduced in size such that space is created in the second display region that can be used for the information relating to the driver assistance system.

A benefit of the teachings herein is that the driver of the vehicle can continue to operate the vehicle while an update of the infotainment system is performed. It would therefore be conceivable for software updates to be automated and a visit to a workshop to no longer be necessary. The software updates can be installed, for example, over a wireless interface, by means of which for example a connection to a server or datacenter, e.g. of the car manufacturer, is established. In this manner, it can also in some embodiments be ensured that all vehicles receive a corresponding update. If the driver of the vehicle is forced to have the update performed in a workshop, there is a risk that security updates may be installed too late or not installed at all.

Another benefit of the teachings herein is that the driver of the vehicle can continue to operate the vehicle without noticeable major impairment. Because the information relating to the driver assistance system is shown in a display region that is permanently installed in the vehicle and is located in the area of the field of view of the driver, the driver can continue driving unimpeded even when the infotainment system is not ready for use during the update.

Further embodiments are apparent from the dependent claims.

In some embodiments, it is provided that images detected by a rear view camera are displayed in the second display region of the instrument cluster when the software component of the infotainment system is being updated. According to the Federal Motor Vehicle Safety Standards, a standard applicable in the U.S., the rear view camera image must be displayable at all times when the vehicle is in a drivable state and is moving backwards. To prevent the vehicle from having to be stopped when the infotainment system, i.e., a potentially primary display device for showing the rear view camera image, is being updated, driving operation can be continued by showing the rear view camera image in the second display region of the instrument cluster.

Alternatively or additionally and in some embodiments, it can be provided that information about a parking assistance system is displayed in the second display region when the software component of the infotainment system is being updated. Especially with parking assistance systems, the driver of the vehicle is given an opportunity, by means of additional information shown on a display, to check their route and correct it if necessary. If the vehicle should be drivable during an update of the infotainment system, it is beneficial that the information relating to the driver assistance system is shown in an additional display region, meaning the second display region, so that the driver of the vehicle does not have to do without the corresponding assistance function.

In some embodiments, it is provided that acoustic signals of a parking assistance system are output by the instrument cluster when the software component of the infotainment system is being updated. Often, information about the parking assistance system is also transmitted acoustically to the driver of the vehicle. It is typical for the driver of the vehicle to receive a notice regarding a distance of the vehicle from an obstacle by means of the frequency of a repeating acoustic signal. The higher the repetition rate of the signal, the closer the vehicle is to the obstacle, until the vehicle has fallen below a minimum distance with a continuous acoustic signal, as a result of which it is indicated to the driver of the vehicle that they should not drive farther in this direction.

This acoustic warning can also be output accordingly from the instrument cluster instead of by the infotainment system. Accordingly, the instrument cluster in some embodiments has at least one speaker.

For example, the parking assistance system is a parking distance check (also referred to as 'park distance control' or 'park assist') and/or a parking steering assistant. Especially in the case of a parking distance check or a parking steering system, the driver of the vehicle requires additional aid to be able to use the functions of the assistant correctly. Without visual or acoustic signals, the parking distance check cannot be usefully used by the driver of the vehicle. Exactly the same is true with visual and/or acoustic information of a parking steering assistant, which guide the driver of the vehicle through the parking process to help them, for example, correctly estimate the dimensions of the parking space or give notices of when the vehicle should be moved.

To simplify the data transmission, it is provided in some embodiments that the information relating to the driver assistance system can be transmitted selectively to the infotainment system and/or the instrument cluster by means of a central gateway. A central gateway can be an independent computing unit (also referred to as 'processor' or 'processing circuit') of the vehicle that is designed to transfer data to various hardware components, e.g., on different databases of the vehicle. The gateway can be connected by a wire to the infotainment system and the instrument cluster in order to implement a connection between the components that is as free from disturbances as possible. Through a central distribution of the data through the gateway, an independent switching of the information relating to the driver assistance systems from the infotainment system to the instrument cluster can be implemented. If the data should only be transferred from the infotainment system to the instrument cluster, faulty update processes can lead to the information not being correctly transferred.

In some embodiments, a vehicle is provided with at least one infotainment system with at least one first display region, with at least one instrument cluster with at least one second display region, and with at least one driver assistance system. It is provided that a method according to the teachings herein can be performed by one or more of the vehicle, the infotainment system, the central gateway, and the instrument cluster. The embodiments herein relating to the method also apply accordingly to the vehicle and vice versa.

In some embodiments, it is provided that the infotainment system is connected to the instrument cluster through a central gateway. A central gateway can be an independent computing unit of the vehicle that is designed to transfer data to various hardware components on, such as on different databases of the vehicle.

In addition, it can be provided in some embodiments that the infotainment system, the central gateway, and the instrument cluster are connected by means of a CAN bus and/or Ethernet. A wired connection of the devices to each other can ensure failure-resistant communication. However, it would also be conceivable in some embodiments that the devices are connected to each other by means of wireless communication.

In some embodiments of the vehicle, it is provided that the second display region of the instrument cluster is arranged in an extended field of view of the driver of the vehicle. An extended field of view of the driver of the vehicle is understood to mean that the driver of the vehicle can see the second display region without moving their head, for example, out of the corner of their eye, so that they can continue to direct their attention to traffic. As a result, the driver of the vehicle is not impaired while driving by an update of the software component of the infotainment system.

Electronic or electrical devices and/or other relevant devices or components according to the embodiments described herein can be implemented using any suitable hardware, firmware (for example, an application-specific integrated circuit), software, or a combination of software, firmware, and hardware. For example, the various components of these devices can be housed on an integrated circuit (IC) or on separate IC chips. In addition, the various components of these devices can be implemented using discrete or integrated components on a flexible printed circuit foil, a tape carrier package (TCP), a printed circuit board (PCB), or on a single substrate, such as for example a semiconductor substrate. In addition, one or more of the various components of these devices could be provided as a process or thread that runs on one or more processors (in one or more computer devices), executes computer program instructions, and interacts with other system components in order to execute the various functions described here. The computer program instructions are stored in a memory, which can be implemented in a computer device using a standard memory, such as random access memory (RAM). The computer program instructions can also be stored in other non-transient computer-readable media, such as on a CD-ROM, a flash drive, or similar. A person skilled in the art will also recognize that the functionality of various computer devices or components discussed herein can be combined or integrated into a single computer device, processor, or processing circuit, or that the functionality of a specific computer device, processor, or processing circuit can be distributed onto one or more other computer devices, processors, or processing circuits without deviating from the scope of the embodiments discussed herein.

The various embodiments discussed in this application can beneficially be combined with one another, unless designed otherwise in individual cases.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

FIG. 1a shows the interior of a vehicle 10, wherein the vehicle has an infotainment system 12 with a first display region 14 and an instrument cluster 16 with a second display region 18. The first display region 14 of the infotainment system 12 is located in the central region of the cockpit of the vehicle 10. The infotainment system 12 is designed so that the driver of the vehicle 10 can control various functions of the vehicle 10 using a touch function of the first display region 14 or, respectively, receives information about these vehicle functions. For example, the radio and a hands-free apparatus can be controlled by means of the infotainment system. Furthermore, information about the vehicle status can be called up, such as possible fuel consumption, servicing intervals, et cetera. In addition, controlling light elements within the vehicle is also provided.

Driver assistance systems are also visualized in the first display region 14 so that the driver of the vehicle 10 can receive support in various driving situations. In the present exemplary embodiment, for instance, a parking distance control and a parking steering system are shown graphically in the first display region 14 in order for the driver of the vehicle 10 to estimate a distance to any obstacles, which may not be perceptible through the windows or mirrors of the vehicle under certain circumstances, via the first display region 14. Such assistance systems typically use sensors that are installed on and in the vehicle and are connected to an evaluation unit. The data from the evaluation unit can then be forwarded to the infotainment system and processed such that a clear graphical representation can be provided for the driver of the vehicle 10.

In order that the infotainment system 12 can graphically show the data accordingly, the system comprises at least one software component. To close security gaps, add new functions, or eliminate faults, software components often require an update. Such updates are typically performed in a workshop, wherein the vehicle 10 is then not available to the driver for a certain period of time. There is the possibility of transmitting such updates in an automated manner, so that at least the infotainment system, for example, is connected wirelessly to a server of the car manufacturer and the corresponding update can also be performed outside of a workshop. However, the infotainment system 12 can typically not be used during the update process. The assistance functions are thus also not available to their full extent.

Figure 1B:
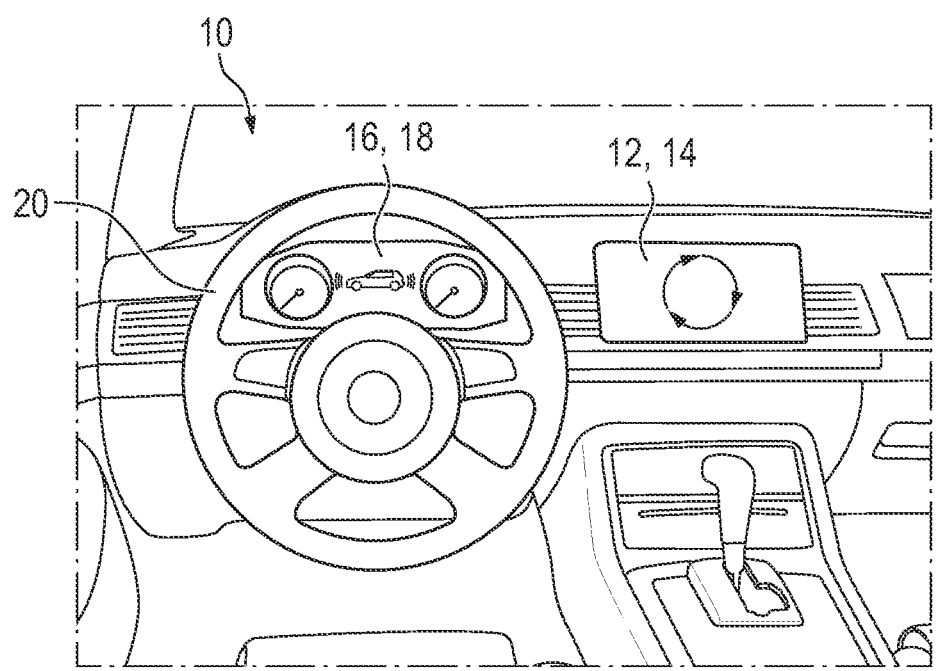

It is therefore provided that the information shown in the first display region 14 is transmitted to the instrument cluster 16 or, respectively, to the second display region 18 of the instrument cluster 16 when an update of the software component of the infotainment system 12 is taking place. The instrument cluster 16 is located behind the steering wheel 20 of the vehicle, well visible for the driver of the vehicle 10. As a result, the driver of the vehicle 10 can perceive the transferred information relating to the assistance systems in the second display region 18 of the instrument cluster without changing the viewing direction while driving. In this case, the second display region 18 of the instrument cluster 16 is also designed as a display so that the information about the driver assistance system can also be displayed in the same style in the second display region 18 of the instrument cluster 16, as can be seen in FIG. 1b.

When the update of the software component of the infotainment system 12 is completed, it is provided that the information about the driver assistance systems is again displayed in the first display region 14 of the infotainment system 12 as soon as the infotainment system 12 is ready again.

Figure 2:
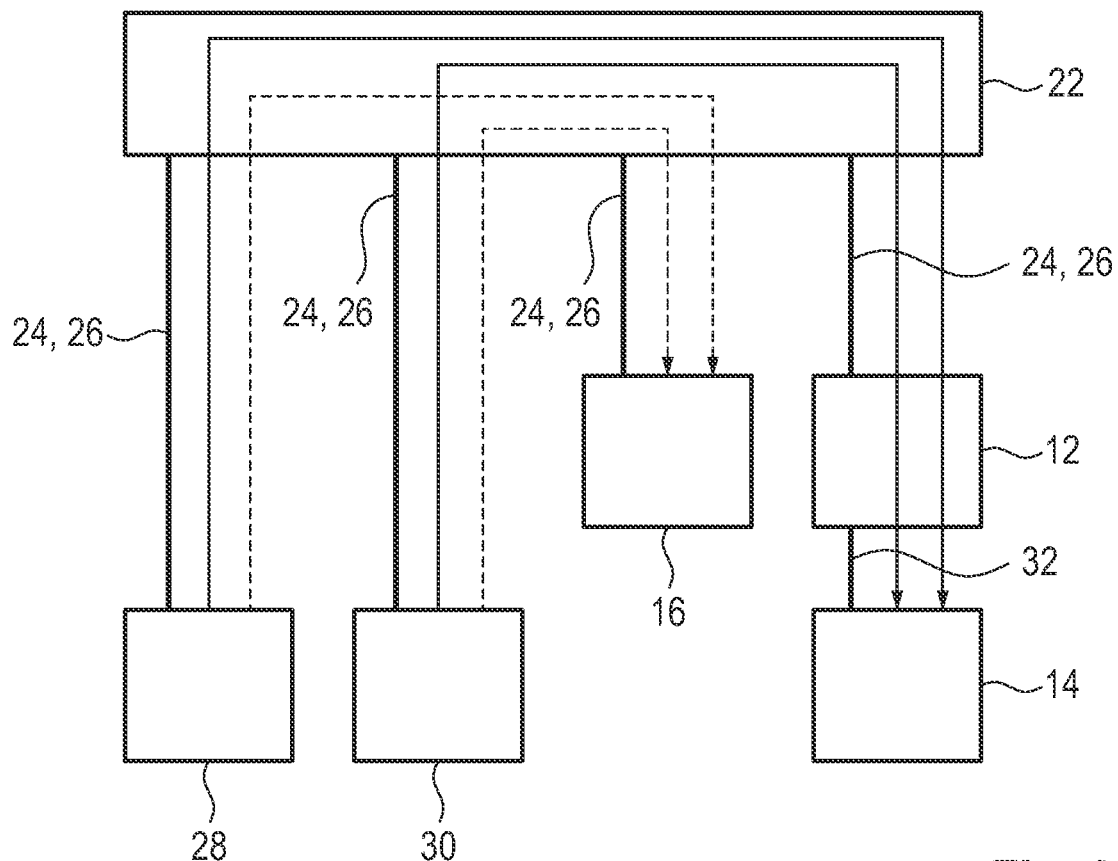
FIG. 2 schematically shows a block diagram of an embodiment of a method according to the teachings herein.

FIG. 2 shows a schematic representation of an exemplary embodiment of a method for updating the software component of the infotainment system being performed. It can be seen here that the infotainment system 12 and the instrument cluster 16 are each connected to each other by a wire via a central gateway 22. The wired connection offers a comparably failure-resistant data transfer, which is of benefit if devices are permanently installed within the vehicle 10. The wire connection is implemented for various components, in each case by means of a CAN bus or, respectively, by means of Ethernet. The central gateway 22 is an independent computing unit within the vehicle 10 that is designed to transfer data to various hardware components of the vehicle 10. Through a central distribution of the data through the gateway 22, an independent switching of the information relating to the driver assistance systems from the infotainment system 12 to the instrument cluster 16 can be implemented. If the data should only be transferred directly from the infotainment system 12 to the instrument cluster 16, faulty update processes can lead to the information not being correctly transferred.

The central gateway 22 is also connected to hardware components of the respective driver assistance systems. On the one hand, a connection to a parking platform 28 exists, which in turn is connected to sensors of various parking assistants, such as a parking distance check, a parking steering system, and an intelligent parking assistant. Furthermore, the central gateway 22 is connected to a rear view camera 30, the image from which can also be transferred to the instrument cluster 16 or, respectively, to the second display region 18 of the instrument cluster 16 during the update process of the software component of the infotainment system 12.

The arrows in FIG. 2 indicate the flow of data, which is different in the two cases, updating the infotainment system and the normal case. In the normal case, the data from the parking platform 28 is transferred to the infotainment system 12 through the gateway 22. By means of low-voltage differential signaling (LVDS), the image data is relayed to the first display region 14 of the infotainment system. In addition, acoustic signals are also output through the infotainment system 12 when, for example, the parking distance check is activated. The acoustic signals can give the driver of the vehicle 10 a feel for the distance of the vehicle 10 from an obstacle.

If an update of the software component of the infotainment system 12 is performed, the information (both acoustic and visual) is shown by the instrument cluster 16, as illustrated by the dotted arrow.

LIST OF REFERENCE NUMERALS

10 Vehicle
12 Infotainment system
14 First display region
16 Instrument cluster
18 Second display region
20 Steering wheel
22 Gateway
24 CAN bus
26 Ethernet
28 Parking platform
30 Rear view camera
32 LVDS The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a vehicle, wherein the vehicle comprises at least one infotainment system with at least one first display, wherein the vehicle comprises at least one instrument cluster with at least one second display, wherein the first display is spaced from the second display and wherein at least the infotainment system comprises at least one software component, comprising:
    displaying information relating to driver assistance systems in the first display of the infotainment system;
    initiating an update of the at least one software component; and
    while the at least one software component of the infotainment system is being updated during a software update install, moving the information relating to the driver assistance systems from the first display to the second display of the instrument cluster, so that the information continues to be shown during the software update install.

2. The method of claim 1, comprising displaying images detected by a rear view camera in the second display of the instrument cluster when the software component of the infotainment system is being updated.

3. The method of claim 1, comprising displaying information about a parking assistance system in the second display when the software component of the infotainment system is being updated.

4. The method of claim 1, comprising outputting acoustic signals of a parking assistance system by the instrument cluster when the software component of the infotainment system is being updated.

5. The method of claim 3, wherein the parking assistance system comprises one or more of a parking distance check and a parking steering assistant.

6. The method of claim 1, wherein the information relating to the driver assistance system can be transmitted selectively to the infotainment system and/or the instrument cluster by means of a central gateway.

7. A vehicle, comprising:
    at least one infotainment system with at least one first display;
    at least one instrument cluster with at least one second display; and
    at least one driver assistance system, wherein the first display is spaced from the second display and wherein the vehicle is configured to:
    display information relating to driver assistance systems in the first display region of the infotainment system;
    initiate an update the at least one software component; and
    while the at least one software component of the infotainment system is being updated during a software update install, move the information relating to the driver assistance systems from the first display region to the second display region of the instrument cluster, so that the information continues to be shown during the software update install.

8. The vehicle of claim 7, wherein the infotainment system is connected to the instrument cluster through a central gateway.

9. The vehicle of claim 8, wherein the infotainment system, the central gateway, and the instrument cluster are connected by means of a CAN bus and/or Ethernet.

10. The vehicle of claim 7, wherein the second display region of the instrument cluster is arranged in an extended field of view of the driver of the vehicle.

11. The method of claim 1, wherein the vehicle is a motor vehicle.

12. The method of claim 2, comprising displaying information about a parking assistance system in the second display region-when the software component of the infotainment system is being updated.

13. The method of claim 2, comprising outputting acoustic signals of a parking assistance system by the instrument cluster when the software component of the infotainment system is being updated.

14. The method of claim 3, comprising outputting acoustic signals of a parking assistance system by the instrument cluster when the software component of the infotainment system is being updated.

15. The method of claim 4, wherein the parking assistance system comprises one or more of a parking distance check and a parking steering assistant.

16. The method of claim 2, wherein the information relating to the driver assistance system can be transmitted selectively to the infotainment system and/or the instrument cluster by means of a central gateway.

17. The method of claim 3, wherein the information relating to the driver assistance system can be transmitted selectively to the infotainment system and/or the instrument cluster by means of a central gateway.

18. The method of claim 4, wherein the information relating to the driver assistance system can be transmitted selectively to the infotainment system and/or the instrument cluster by means of a central gateway.

19. The vehicle of claim 8, wherein the second display of the instrument cluster is arranged in an extended field of view of the driver of the vehicle.

20. The vehicle of claim 9, wherein the second display region of the instrument cluster is arranged in an extended field of view of the driver of the vehicle.

21. The method of claim 1, wherein the at least one software component of the infotainment system is being updated while the vehicle is driven.

* * * * *